US009342062B2

(12) United States Patent
Allmaras et al.

(10) Patent No.: US 9,342,062 B2
(45) Date of Patent: May 17, 2016

(54) LOW VOLTAGE LOAD CONTROL SWITCH

(71) Applicants: Kevin Allmaras, Carrington, ND (US);
Brock Simonson, Carrington, ND (US);
Roger Rognli, Otsego, MN (US); Brian Boeshans, Carrington, ND (US)

(72) Inventors: Kevin Allmaras, Carrington, ND (US);
Brock Simonson, Carrington, ND (US);
Roger Rognli, Otsego, MN (US); Brian Boeshans, Carrington, ND (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 701 days.

(21) Appl. No.: 13/625,487

(22) Filed: Sep. 24, 2012

(65) Prior Publication Data

US 2014/0088777 A1    Mar. 27, 2014

(51) Int. Cl.
| G05D 3/12 | (2006.01) |
| G05B 15/02 | (2006.01) |
| H02J 3/14 | (2006.01) |
| H02J 3/32 | (2006.01) |
| H02J 3/38 | (2006.01) |
| H02J 7/34 | (2006.01) |

(52) U.S. Cl.
CPC . *G05B 15/02* (2013.01); *H02J 3/14* (2013.01); *H02J 3/32* (2013.01); *H02J 3/382* (2013.01); *H02J 7/345* (2013.01)

(58) Field of Classification Search
CPC ....... G06Q 50/06; G06Q 10/06; G06Q 10/00; G06Q 10/06312; G06Q 30/06; G06Q 10/04; G06Q 10/0637; Y02B 70/3225; Y02B 70/3266; Y02B 90/2653
USPC .......................... 700/286, 291, 295, 297, 300
See application file for complete search history.

(56) References Cited

U.S. PATENT DOCUMENTS

| 4,213,058 | A | * | 7/1980 | Townsend ...................... 307/40 |
| 4,382,544 | A | * | 5/1983 | Stewart ...................... 236/46 R |
| 5,151,907 | A | * | 9/1992 | Robbins .......................... 714/22 |
| 5,576,700 | A | * | 11/1996 | Davis et al. .................. 340/3.31 |
| 7,218,998 | B1 | * | 5/2007 | Neale ........................... 700/295 |
| 7,525,826 | B2 | * | 4/2009 | Iwamoto et al. ............. 363/56.1 |
| 7,528,503 | B2 | * | 5/2009 | Rognli et al. ................... 307/62 |
| 8,892,266 | B2 | * | 11/2014 | Rossi et al. .................. 700/291 |
| 2002/0010518 | A1 | | 1/2002 | Reid et al. |
| 2005/0200593 | A1 | * | 9/2005 | Willemin et al. ............. 345/156 |
| 2009/0284084 | A1 | * | 11/2009 | Avis .................... H01M 2/1055 307/112 |
| 2010/0276999 | A1 | * | 11/2010 | Gow et al. ....................... 307/64 |
| 2011/0006887 | A1 | | 1/2011 | Shaull et al. |

(Continued)

FOREIGN PATENT DOCUMENTS

WO    9222953 A1    12/1992

OTHER PUBLICATIONS

International Search Report and Written Opinion From Corresponding PCT Application No. PCT/US2013/061191, mailed Jan. 16, 2014, 7 pages.

*Primary Examiner* — Darrin Dunn
(74) *Attorney, Agent, or Firm* — King & Spalding LLP

(57) ABSTRACT

A method, device, and system for controlling power delivered to a power-consuming device. The device can receive a control signal from a thermostat, where the control signal activates the device. The device can then determine when a control event is to occur. At such time, the device terminates power delivered to the power-consuming device and continues to withhold the power until the control event expires. When the control event has ended, the device allows power to flow to the power-consuming device. The device uses a timer and a communication component to send and receives signals associated with a control event to a user.

20 Claims, 6 Drawing Sheets

(56) References Cited

U.S. PATENT DOCUMENTS

| | | | |
|---|---|---|---|
| 2012/0074123 A1* | 3/2012 | Hodapp et al. | 219/394 |
| 2012/0083939 A1 | 4/2012 | Rognli | |
| 2013/0132010 A1* | 5/2013 | Winger et al. | 702/63 |
| 2014/0088777 A1* | 3/2014 | Allmaras et al. | 700/295 |

* cited by examiner

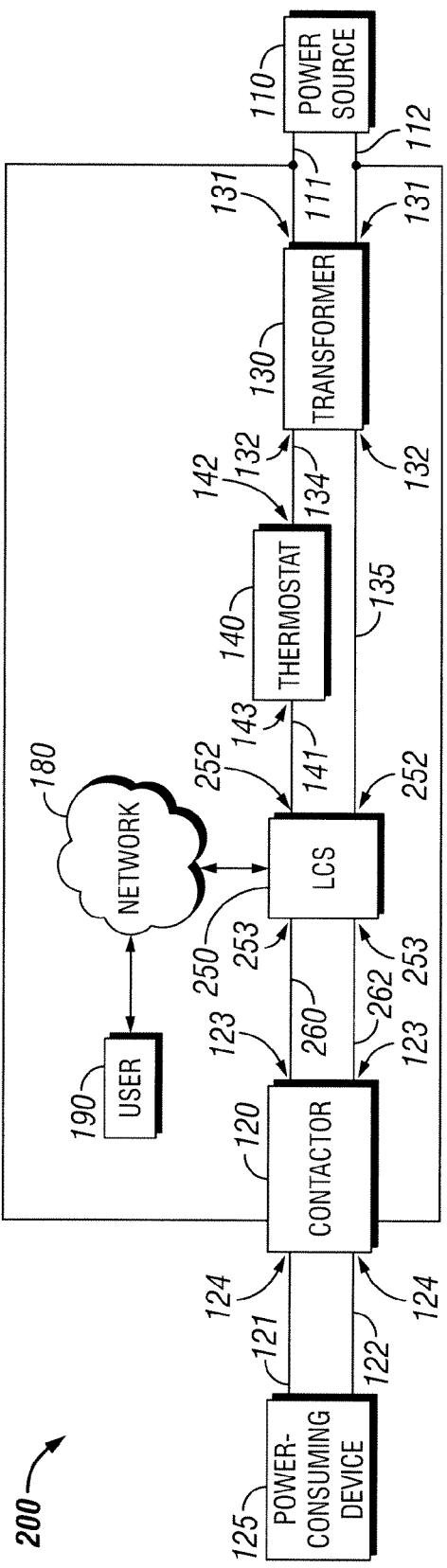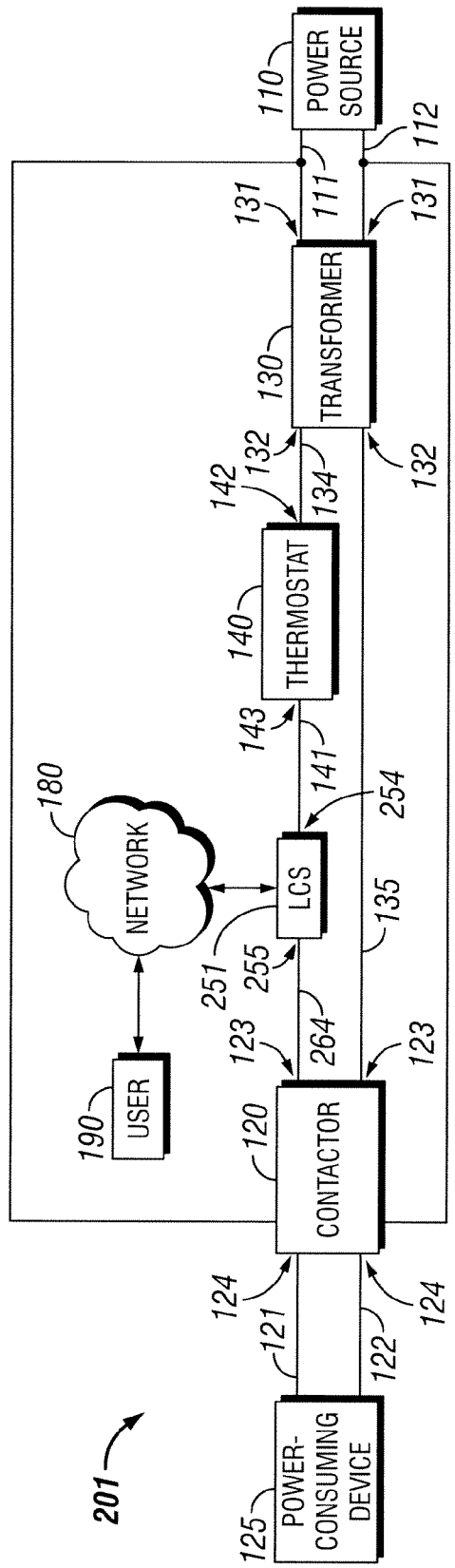

LOW VOLTAGE LOAD CONTROL SWITCH

TECHNICAL FIELD

The present disclosure relates generally to load control switches (LCSs) and more particularly to systems, methods, and devices for low voltage LCSs, or LCSs that operate at low voltages.

BACKGROUND

LCSs (sometimes referred to as load control receivers (LCRs)) are used as part of a demand-side management scheme to control the operation of certain power-consuming devices. Examples of such power-consuming devices include, but are not limited to, an air conditioning unit, a water heater, a heater, and a circulation fan. Controlling such power-consuming devices involves determining when a control event (i.e., preventing power from flowing to such devices) occurs and for how long.

At times, a LCS is installed with an existing power-consuming device. In such a case, the LCS is installed by electrically coupling different components of the existing power-consuming device to various portions of the LCR. For example, a power source from the power-consuming device is electrically coupled to the LCR. Such work often requires a licensed electrician because at least a portion of the power feeding the LCS is at least 110 V alternating current (AC), and so applicable regulations often require a licensed electrician when working with wiring at such voltages. Consequently, the installation of LCSs can be expensive and inconvenient.

SUMMARY

In general, in one aspect, the disclosure relates to a method for controlling power delivered to a power-consuming device. The method can include receiving a low voltage signal from a thermostat, and applying the low voltage signal to a number of components. The method can also include determining, using a communication component and a timer, a start time of a control event. The method can further include terminating, using a relay at the start time of the control event, the power delivered to the power-consuming device. The method can also include delivering, using the relay at an end time of the control event, the power to the power-consuming device. The method can further include deactivating when the low voltage signal from the thermostat is terminated.

In another aspect, the disclosure relates to a load control receiver. The load control receiver can include a power supply electrically coupled to a thermostat, where the power supply activates upon receiving a control signal originating from the thermostat. The load control receiver can also include a timer electrically coupled to an alternative power source, and memory for storing a number of instructions. The load control receiver can also include a hardware processor communicably coupled to the power supply, the timer, and the memory, where the hardware processor executes the instructions stored in the memory. The load control receiver can further include a communication component communicably coupled to the hardware processor, where the communication component receives an instruction signal for a control event. The load control receiver can also include a relay electrically coupled to the hardware processor and the power supply, where the relay comprises a relay contact, where the relay contact has an open state and a closed state, where the open state is enabled during the control event, and where the closed state is enabled outside of the control event.

In yet another aspect, the disclosure relates to a system. The system can include a power-consuming device, a transformer, a thermostat, and a load control receiver. The transformer can generate a control signal from a power signal received from a power source. The thermostat can be electrically coupled to the transformer, where the thermostat has an enabled state and a disabled state, where the enabled state allows the control power to pass therethrough, and where the disabled state prevents the control power to pass therethrough. The load control receiver can be electrically coupled to the thermostat and the power-consuming device. The load control receiver can include a power supply electrically coupled to the thermostat, where the power supply activates upon receiving the control signal from the thermostat. The load control receiver can also include a timer electrically coupled to an alternative power source, and memory for storing a number of instructions. The load control receiver can further include a hardware processor communicably coupled to the power supply, the timer, and the memory, where the hardware processor executes the instructions stored in the memory. The load control receiver can also include a communication component communicably coupled to the hardware processor, where the communication component receives a signal for a control event. The load control receiver can further include a relay electrically coupled to the hardware processor, the power supply, and the power-consuming device, where the relay comprises a relay contact, where the relay contact has an open state and a closed state, where the open state is enabled during the control event, and where the closed state is enabled outside of the control event. The relay contact, when in the closed state, can deliver the power processed by the transformer to the power-consuming device.

These and other aspects, objects, features, and embodiments will be apparent from the following description and the appended claims.

BRIEF DESCRIPTION OF THE DRAWINGS

The drawings illustrate only exemplary embodiments and are therefore not to be considered limiting in scope, as the exemplary embodiments may admit to other equally effective embodiments. The elements and features shown in the drawings are not necessarily to scale, emphasis instead being placed upon clearly illustrating the principles of the exemplary embodiments. Additionally, certain dimensions or positionings may be exaggerated to help visually convey such principles. In the drawings, reference numerals designate like or corresponding, but not necessarily identical, elements.

FIG. 2A shows a block diagram of a system that includes a power-consuming device and an exemplary LCS in accordance with certain exemplary embodiments.

FIG. 2B shows another block diagram of a system that includes a power-consuming device and another exemplary LCS in accordance with certain exemplary embodiments.

DETAILED DESCRIPTION

Figure 1:
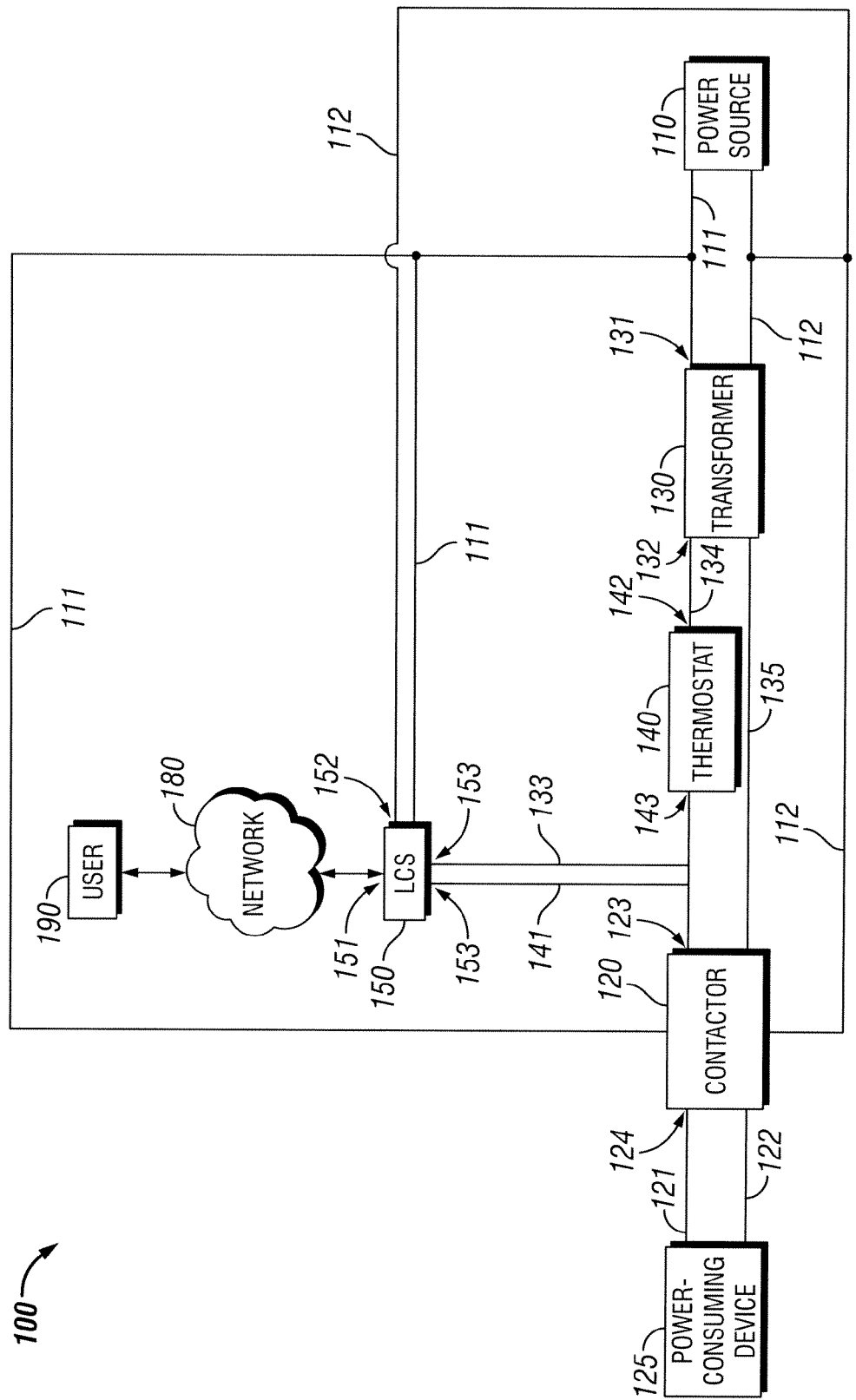
FIG. 1 shows a block diagram of a system that includes a power-consuming device and a LCS configured in a way known in the art.

Exemplary embodiments of a low voltage LCS will now be described in detail with reference to the accompanying figures. Like, but not necessarily the same or identical, elements in the various figures are denoted by like reference numerals for consistency. In the following detailed description of the exemplary embodiments, numerous specific details are set forth in order to provide a more thorough understanding of the disclosure herein. However, it will be apparent to one of ordinary skill in the art that the exemplary embodiments herein may be practiced without these specific details. In other instances, well-known features have not been described in detail to avoid unnecessarily complicating the description. Further, certain descriptions (e.g., top, bottom, side, end, interior, inside, inner, outer) are merely intended to help clarify aspects of the invention and are not meant to limit embodiments described herein.

In general, exemplary embodiments provide systems, methods, and devices for low voltage LCSs. Specifically, exemplary embodiments provide for LCSs that are electrically coupled to low voltage (i.e., for AC circuits, less than 110 VAC) and/or current sources. As used herein, low voltage and/or current sources can be called a control voltage or a control signal. By contrast, a higher voltage and/or current, as used herein, can be at least 110 VAC for AC circuits and can be called a voltage signal. By providing a LCS that electrically couples to low voltages, the installation of an exemplary LCS can be performed without a licensed electrician. As a result, using exemplary embodiments described herein, the LCS can be installed more easily, at a higher level of convenience, and at a lower cost. As used herein, low voltage can also mean low current and/or low power.

An electrical connection made between a component of a power-consuming device (or part of a system thereof) and the exemplary LCS can involve a single conductor mated with a single conductor receiver. Alternatively, an electrical connection can also involve multiple conductors and/or multiple conductor receivers. As another alternative, an electrical connection can involve a male and corresponding female mating connector.

Exemplary LCSs discussed herein can be used with one or more of a number of control signals. For example, a LCS can be electrically coupled to 24 VAC. Specifically, the control signal feeding the LCS also flows through the thermostat (or similar control device) used for the power-consuming device.

Any contact (e.g., for a relay, thermostat, contactor) described herein can be normally-open or normally-closed. A contact that is closed is enabled, and a contact that is open is disabled. When a contact is described as normally-open, the contact can, in an alternative embodiment, be configured as normally-closed. Likewise, a contact described as normally-closed can, in an alternative embodiment, be configured as normally-open. In such a case, other components (e.g., a coil) can be configured the same or differently to achieve the same operational result.

In certain exemplary embodiments, a latch relay can be used. A contact for a latch relay maintains its most recent state from when the coil was most recently exercised. The subsequent time the coil is energized, the contact changes state (e.g., from open to closed, from closed to open) from its previous state and maintains that new state until the next time the coil is energized, and so on. When one voltage (e.g., a control voltage) is electrically coupled to the coil of the relay, a different voltage (e.g., a power voltage) can be electrically coupled to the contact of the relay.

In certain exemplary embodiments, the exemplary low voltage LCR, the power-consuming device to which the exemplary LCS is coupled, and/or a system that includes the exemplary low voltage LCS is subject to meeting certain standards and/or requirements. For example, the National Electric Code (NEC) and the Institute of Electrical and Electronics Engineers (IEEE) set standards as to wiring and electrical connections. As another example, the National Electrical Manufacturer's Association (NEMA) classifies electrical connectors by current ratings (e.g., 15 A, 60 A), voltage ratings (e.g., 125V, 600V), conductor dimensions (e.g., widths, shapes, orientation), grounding requirements, and other factors. Use of exemplary embodiments described herein meet (and/or allow a corresponding device to meet) such standards when required.

FIG. 1 depicts a block diagram of a system 100 that includes a power-consuming device and a LCS currently known in the art. FIG. 1 includes a power source 110, a LCS 150, a user 190, a transformer 130, a thermostat 140, a contactor 120, and a power-consuming device 125. One or more components shown in FIG. 1 can be omitted, repeated, and/or substituted.

The power source 110 is shown being electrically coupled to the LCS 150, the contactor 120, and the primary side 131 of the transformer 130. The power source 110 typically provides electricity that is in AC format and/or direct current (DC) format. The power source 110 can be physically separate from the other components of the system 100 and/or internal within another component of the system 100. In cases where the power source 110 delivers AC power, the power source 110 has a voltage conductor 111 and a neutral conductor 112. In cases where the power source 110 delivers DC power, the power source 110 has a positive conductor 111 and a negative conductor 112. For purposes of this example, an AC system is described, but those skilled in the art will appreciate how an AC system can be substituted for a DC system.

Each voltage conductor and/or neutral conductor described herein can carry voltage, current, or a combination thereof. In addition, each voltage conductor and/or neutral conductor described herein can be wire, cable, or other medium that can carry a voltage and/or current therethrough. The conductor can be made of an electrically conductive material (e.g., copper, aluminum) and can have one or more electrically non-conductive materials (e.g., rubber, nylon, plastic) wrapped around the electrically conductive material. The electrically conductive material of the conductor can be one of a number of sizes (e.g., 10 American wire gauge (AWG), 12 AWG, 16 AWG) that allow the conductor to carry the voltage and/or current required for the system 100.

The amount of voltage delivered by the power source 110 to the LCS 150 and the primary side 131 of the transformer 130 can be any amount suitable to operate the elements of the LCS 150 as well as the other elements electrically coupled to the secondary side 132 of the transformer 130. In certain exemplary embodiments, the voltage delivered by the power source 110 is transformed, rectified, inverted, and/or otherwise manipulated, at the power source 110 so that the primary side 131 of the transformer 130 receives a proper voltage level to operate properly.

In certain exemplary embodiments, the power source 110 is interruptible. For example, an "on/off" switch (not shown) may be integrated with, or operatively coupled to, the power source 110. Such an "on/off" switch can be used to allow and prevent power from flowing to the LCS 150 and/or other components of the system 100. The "on/off" switch can be operated by a user 190, by a sensing device, by a timer, by the occurrence of some condition (e.g., the passage of time), by some other factor, or any combination thereof. The "on/off" switch may be integrated with, or separate from, the power source 110.

The LCS 150 is electrically coupled to the voltage conductor 111 and the neutral conductor 112 from the power source 110 and receives power from the power source 110 through the voltage conductor 111 and the neutral conductor 112 at the power-receiving portion 152 of the LCS 150. For example, the LCS 150 can receive 120 VAC through the voltage conductor 111 at the power-receiving portion 152 and complete the circuit back to the power source 110 using the neutral conductor 112. Because the LCS 150 is electrically coupled directly to the power source 110, the LCS 150 can always be on. The LCS 150 also includes a relay contact portion 153. The relay contact of the relay contact portion 153 has one side electrically coupled to the output portion 143 of the thermostat 140 using conductor 133, while the other side of the relay contact portion 153 of the LCS 150 is electrically coupled to the input portion 123 of the contactor 120 using conductor 141.

Details of the components of the LCS 150 are described below with respect to FIGS. 3 and 4. In general, the LCS communicates, using a communication portion 151, with a third party to receive instructions as to when the LCS 150 terminates and/or allows the delivery of power to the transformer 130 and, ultimately, the power-consuming device 125. Such an event is called a control event. The LCS 150 uses the power received from the power source 110 to operate one or more control devices (e.g., relays), communication devices, timers, and/or other suitable components within the LCS 150. When a control event does not exist, the LCS 150 allows the power from the contactor 120 to pass through the relay contact of the relay contact portion 153 to the voltage conductor 121 feeding the power-consuming device 125.

A user 190 can be any person, entity, and/or device that interacts with the LCS 150. One or more users 190 can communicate with the LCS 150. Examples of a user 190 can include, but are not limited to, a master controller, an energy management system, a homeowner, a consumer, a landlord, an electric distribution company, an electric transmission company, a public utility, a control room operator, a load management system, an engineer, an electrician, an instrumentation and controls technician, a mechanic, an operator, a consultant, a contractor, and a manufacturer's representative.

The user 190 communicates with the LCS 150 using a network 180. The network can be any type of wired and/or wireless communication system that allows the user 190 and the LCS 150 to send and receive signals between each other. The system and/or protocols used by the user 190 and compatible for communication with the LCS 150. Communication by the LCS 150 is performed by the communication component of the LCS 150, described below with respect to FIGS. 3 and 4.

The transformer 130 of FIG. 1 is a charge transfer device that receives a voltage and/or current on the primary side 131 and generates a voltage and/or current on the secondary side 132. The transformer 130 can include a number of windings (e.g., inductors) made of an electrically conductive material (e.g., copper, aluminum), one or more solid state components (e.g., integrated gate-commutated thyristors, silicon controlled thyristors), or any combination thereof. The transformer 130 can be configured for AC-to-DC transformation (also called inversion), DC-to-AC transformation (also called conversion), AC-to-AC transformation, and DC-to-DC transformation.

The transformer 130 can be a step-up (higher voltage and/or current on the secondary side 132 when compared to the primary side 131) transformer or a step-down (lower voltage and/or current on the secondary side 132 when compared to the primary side 131) transformer. The primary side 131 and the secondary side 132 can have one or more ratios relative to each other. For example, the ratio between the primary side 131 and the secondary side 132 can be 5:1, which would convert 120 VAC received on the primary side 131 to generate 24 VAC on the secondary side 132. As another example, the ratio between the primary side 131 and the secondary side 132 can be 10:1, which would convert 240 VAC received on the primary side 131 to generate 24 VAC on the secondary side 132. In either example, the primary side 131 of the transformer 130 interacts with a power voltage, while the secondary side 132 of the transformer 130 generates a signal voltage based on the power voltage. The transformer 130 can have one or more settings that allow the ratio between the primary side 131 and the secondary side 132 to vary, either according to input received from a user 190 or from software instructions.

The secondary side 132 of the transformer 130, like the primary side 131, has a conductor 134 and a conductor 135. The conductor 134 of the secondary side 132 is electrically coupled to the input portion 142 of the thermostat 140, while the conductor 135 of the secondary side 132 is electrically coupled to the input portion 123 of the contactor 120.

The optional thermostat 140 is a form of a control device that controls the voltage and/or current flowing through the conductor 134 of the secondary side 132 of the transformer 130 to pass therethrough. The thermostat 140 can serve one or more of a number of functions. For example, the thermostat 140 can compare an ambient temperature with a threshold temperature. In such a case, the thermostat 140 can also control a heating, ventilation, and air conditioning unit (HVAC) unit when the power-consuming device 125 is the HVAC unit. Generally speaking, the thermostat 140 has an enabled state and a disabled state. The enabled state allows the voltage and/or current flowing through the conductor 134 of the secondary side 132 of the transformer 130 to pass therethrough to the output portion 143 of the thermostat 140, which is electrically coupled to the input of the contactor 120 by conductor 141. By contrast, the disabled state of the thermostat 140 prevents the voltage and/or current flowing through the output portion 143 of the thermostat 140 using the conductor 134 to the secondary side 132 of the transformer 130.

In certain exemplary embodiments, the thermostat 140 toggles between the enabled state and the disabled state based on whether a parameter (e.g., ambient temperature, air pressure, air flow) exceeds (or in some cases falls below) a threshold value. For example, in terms of a system 100 where the power-consuming device 125 is an air conditioning (A/C) unit, the thermostat 140 compares the ambient temperature at some location with a maximum temperature threshold. If the ambient temperature falls below the maximum temperature threshold, then the thermostat 140 is in the disabled state, which prevents the A/C unit from turning on. If the ambient temperature exceeds the maximum temperature threshold, then the thermostat 140 is in the enabled state, which allows the A/C unit to turn on.

The thermostat 140 can operate using one or more discrete components (e.g., resistors, capacitors, inductors), a hardware processor, some other component, or any combination thereof. The threshold value can be set by a user 190 (e.g., manually with a switch or dial, using a user 190 interface on the thermostat 140, using an application interface from a remote computing device that is communicably coupled to the thermostat 140), by default, automatically using software and based on one or more parameters (e.g., time of year, time of day, geographic location), by some other method, or any combination thereof.

The optional contactor 120 includes a power-receiving portion 123 (in this case receiving a control signal using conductor 141 and conductor 135). As such, the contactor 120 is electrically coupled to the LCS 150 and the transformer 130, and signal voltages flow through the associated conductors. The contactor 120 also includes a relay contact portion 124 (in this case receiving a power voltage signal from conductor 111 and conductor 112. The relay contact portion 124 of the contactor 120 is electrically coupled to the power-consuming device 125 using the conductor 121 and the conductor 122, through which the power voltage flows. The contactor 120 is used to protect the power-consuming device 125 as well as the upstream components (e.g., the thermostat 140, the LCS 150) from voltage and/or current spikes that can result when the power-consuming device 125 is initially powered up and when power to the power-consuming device 125 is terminated. In certain exemplary embodiments, the contactor 120 is part of the power-consuming device 125.

The voltage-receiving portion 123 of the contactor 120 can include an electromagnet, coil, or some similar component that receives the control signal (voltage and/or current) from the conductor 141 and provides a driving force to close the contacts of the relay contact portion 124 of the contactor 120. Normally, the contacts of the relay contact portion 124 are normally open (e.g., disabled). In such a case, the contacts are closed when sufficient power (voltage, current) is received by the voltage-receiving portion 123. When control power (e.g., current, voltage) passes through the electromagnet, a magnetic field is produced. The magnetic field attracts the moving core of the contactor 120. The electromagnet (coil) draws more current initially, until its inductance increases when the metal core enters the coil.

The moving contact is propelled by the moving core, and the force developed by the electromagnet holds the moving and fixed contacts together. When the contactor coil is de-energized, gravity or a spring returns the electromagnet core to its initial position and opens the contacts. When initial power is received from the conductor 141, an electric arc forms across the contacts of the relay contact portion 124 as the contacts close. When the control power from the conductor 141 is terminated, another electric arc can form across the contacts as the contacts are physically separated and return to the normally open state. In steady-state operations when the contacts of the relay contact portion 124 are closed and power flows through the contacts, there is no electric arcing that occurs.

If the power-consuming device 125 does not include any components (e.g., motors, heaters, capacitor banks) that draw high initial amounts of voltage and/or current when starting and/or create voltage and/or current spikes when power is terminated. In such a case, the contactor 120 can be omitted, and the power signal can be fed directly to the power-consuming device 125 from the power source 110 using conductor 111 and conductor 112, eliminating conductor 121 and conductor 122. Further, the control signal can be fed to the power-consuming device 125 from the LCS 150 using conductor 141 and from the transformer 130 using conductor 135. In such a case, the power-consuming device 125 includes some internal control scheme that only permits the power-consuming device 125 to operate when the power-consuming device 125 receives the control signal, even though the power-consuming device 125 otherwise receives the power signal from the power source 110.

The electromagnet (coil) of the voltage-receiving portion 123 and the contacts of the relay contact portion 124 are rated (e.g., have the proper size, are made of the proper material) to withstand the steady-state voltage and/or current delivered by the various conductors (e.g., conductor 141, conductor 111), as well as the voltage and/or current spikes that result from initially receiving and terminating the voltage and/or current from the various conductors. Ratings for the contactor 120 can be governed by one or more of a number of entities, including but not limited to NEMA and the International Electrotechnical Commission (IEC).

The power-consuming device 125 can be any electric-powered device that consumes a sufficient amount of power to warrant being subject to a demand response program. Examples of a power-consuming device 125 can include, but are not limited to, an A/C unit, a water heater, a heating unit, a motor, and a large fan. In certain exemplary embodiments, the power-consuming device 125 operates on a power signal rather than a control signal. In cases where the power-consuming device 125 receives both a power signal and a control signal, the control signal is used to enable the power-consuming device 125, where the operating components of the power-consuming device 125 use the power signal to operate once the power-consuming device 125 is enabled.

When the LCS 150 combined with the contactor 120 (or, if there is no contactor 120, the thermostat 140) allows power generated by the power source 110 to pass on to the power-consuming device 125, the power-consuming device 125 operates. When the LCS 150 in combination with the contactor 120 or the thermostat 140 prevents power generated by the power source 110 to pass on to the power-consuming device 125, the power-consuming device 125 does not operate. By adding the LCS 150 into the system 100, a type of demand-side management program can be implemented by having the LCS 150 prevent power from flowing to the power-consuming device 125 during a control event, when the power-consuming device 125 would otherwise receive the power and operate.

FIGS. 2A and 2B each shows a block diagram of a system that includes a power-consuming device and an exemplary LCS in accordance with certain exemplary embodiments. Specifically, FIG. 2A shows a block diagram of a system 200 that includes the power-consuming device 125 and an exemplary LCS 250 in accordance with certain exemplary embodiments. FIG. 2B shows a block diagram of another system 201 that includes the power-consuming device 125 and another exemplary LCS 251 in accordance with certain exemplary embodiments. In one or more embodiments, one or more of the components shown in FIGS. 2A and 2B can be omitted, repeated, and/or substituted. Accordingly, embodiments of low voltage LCSs should not be considered limited to the specific arrangements of components shown in FIGS. 2A and 2B.

The components of the system 200 in FIG. 2A and the system 201 in FIG. 2B are substantially the same as the corresponding components of the system 100 described above with respect to FIG. 1, except as discussed below. Referring now to FIGS. 1, 2A, and 2B, the LCS 250 in FIG. 2A and the LCS 251 in FIG. 2B no longer receive a power signal from the power source 110. Specifically, the LCS 250 in FIG. 2A and the LCS 251 in FIG. 2B is electrically coupled to, at least, the output portion 143 of the thermostat 140 and the input portion 123 of the contactor 120. While the conductor 111 and the conductor 111 are no longer electrically coupled directly to the LCS 250 of FIG. 2A and the LCS 251 of FIG. 2B, the conductor 111 and the conductor 112 remain electrically coupled to the power source 110, the primary side 131 of the transformer 130, and the relay contact portion 124 of the contactor 120. The conductor 111 and the conductor 112 continue to carry a voltage signal (e.g., at least 110 VAC).

In FIG. 2A, the input portion 252 of the LCS 250 is electrically coupled to both the output portion 143 of the thermostat 140 using conductor 141 and the secondary side 132 of the transformer 130 using the neutral conductor 135. The output portion 253 of the LCS 250 is electrically coupled to the input portion 123 of the contactor 120 using conductors 260 and 262. Details of the LCS 250 shown in FIG. 2A are described below with respect to FIG. 3.

In FIG. 2B, the input portion 254 of the LCS 251 is electrically coupled to the output portion 143 of the thermostat 140 using conductor 141. The output portion 255 of the LCS 251 is electrically coupled to the input portion 123 of the contactor 120 using conductor 264. As in FIG. 1, the input portion 123 of the contactor 120 is also electrically coupled to the secondary side 132 of the transformer 130 using the neutral conductor 135. Details of the LCS 251 shown in FIG. 2B are described below with respect to FIG. 4.

In cases where the power-consuming device 125 is a duplex unit (e.g., an air handler for a heating, ventilation, and air conditioning (HVAC) system), one or more thermostats 140 can carry multiple signals. For example, when the low voltage signal is AC, half of each cycle can be associated with one thermostat calling to turn on an air conditioner, while the other half of each cycle can be associated with another thermostat calling to turn on a heater. In such a case, a constant voltage can be available to the LCS at whatever location the LCS is mounted (e.g., at the compressor unit of the HVAC system).

Figure 3:
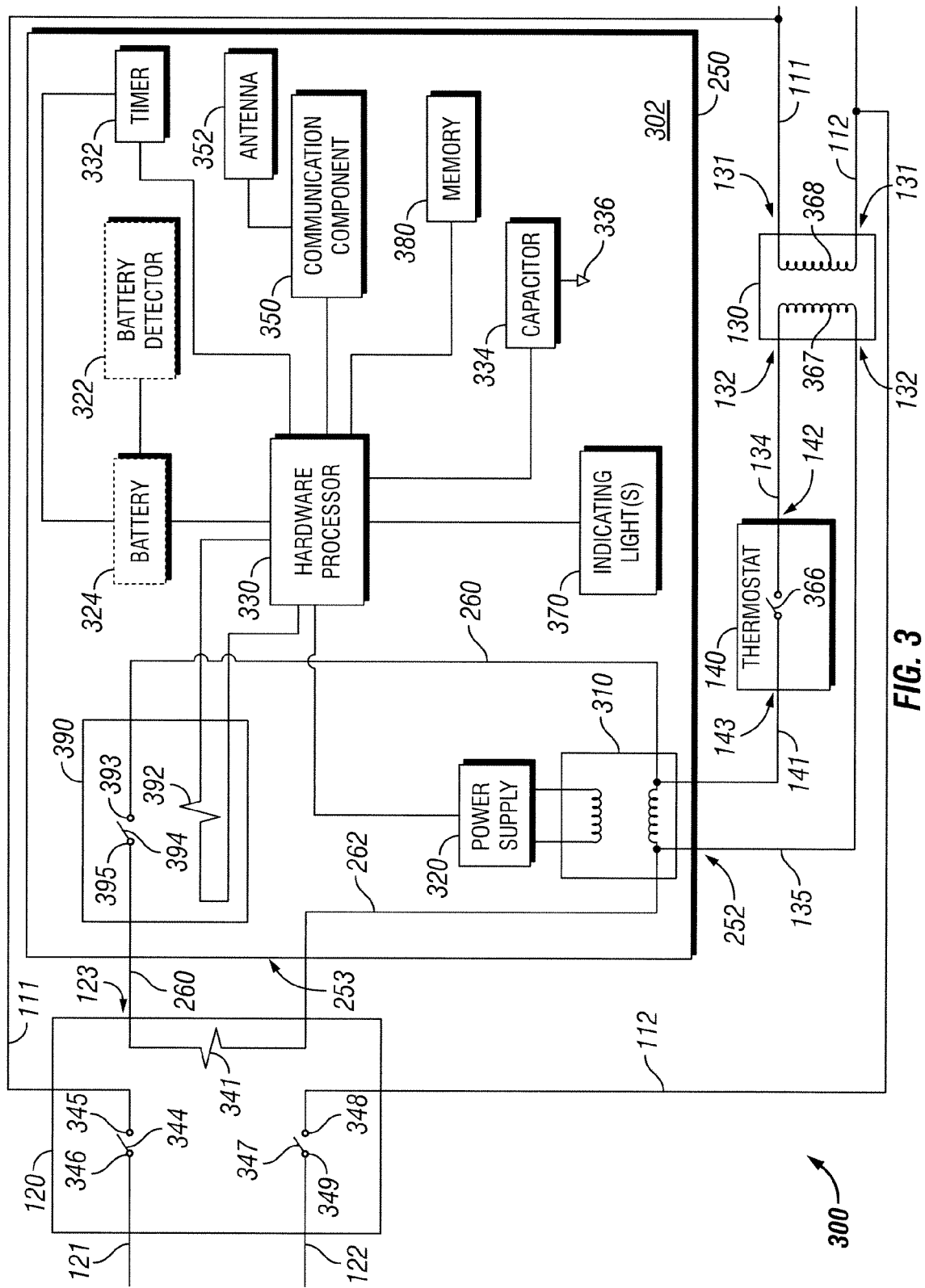
FIG. 3 shows a circuit diagram of an exemplary LCS in accordance with certain exemplary embodiments.

FIG. 3 shows a circuit diagram 300 of an exemplary LCS 250 in accordance with certain exemplary embodiments. Specifically, the circuit diagram 300 shows a portion of the system 200 of FIG. 2A. The circuit diagram 300 includes the LCS 250, the contactor 120, the thermostat 140, and the transformer 130. The LCS 250 of FIG. 3 includes a housing 302, inside of which are disposed a transformer 310, a power supply 320, a hardware processor 330, a timer 332, a capacitor 334, a communication component 350, a relay 390, one or more indicating lights 370, an optional battery 324, and an optional battery indicator 322. In certain embodiments, one or more of the components shown in FIG. 3 can be combined, omitted, repeated, and/or substituted. Accordingly, embodiments of the exemplary LCS 250 should not be considered limited to the specific arrangements of components shown in FIG. 3.

Referring to FIGS. 1-3, a schematic of the contactor 120 in FIG. 3 shows the coil 341 and a pair of contacts (contact 344 and contact 342), where the coil and each contact are substantially similar to the corresponding components described above with respect to FIG. 1. In this case, the contacts (contact 344 and contact 342) are normally-open. A schematic of the thermostat 140 in FIG. 3 shows the relay contact 366 in the disabled state (open), as described above with respect to FIG. 1. In addition, a schematic of the transformer 130 shows the winding 368 of the primary side 131 and the corresponding winding 367 of the secondary side 132.

In certain exemplary embodiments, the housing 302 is a type of enclosure that houses one or more of the components of the LCS 250. The housing 302 can have a movable portion that allows a user 190 to access the one or more components of the LCS 250 located inside the housing 302. The housing can be made of one or more of a number of suitable materials, including but not limited to plastic, metal, glass, and rubber. The housing 302 can be mounted in one or more locations when connected to the system 300. For example, the housing 302 can be mounted in or near a compressor unit of an A/C system. As another example, the housing 302 can be mounted in or near an air handler (e.g., furnace) of a HVAC system. In such a case, a low voltage power source (aside from the thermostat 140) can be used to provide power (either constantly or intermittently) to the LCS 250.

In certain exemplary embodiments, the transformer 310 is substantially similar to the transformer 130 described above. Specifically, the transformer 310 applies transformation, inversion, conversion, and/or any other charge transforming method, in increasing or decreasing voltages and/or currents, to power received on the primary side 311 from the output portion 143 of the thermostat 140 using the conductor 141 and from the neutral conductor 135 from the secondary side 132 of the transformer 130. The result is a voltage and/or current, in increased or decreased magnitude, that is distributed by the secondary side 312 of the transformer 310 to the power supply 320. The primary side 311 of the transformer 310 is also electrically coupled to the input portion 391 of the relay contact 390 internal to the LCS 250, and the secondary side 312 of the transformer 310 is also electrically coupled to the input portion 123 of the contactor 120 using the neutral conductor 262. The transformer 310 can be internal to the LCS 250. Alternatively, the transformer 310 can be located outside the housing 302 and operatively coupled to one or more components inside the housing 302.

In certain exemplary embodiments, the power supply 320 is internal to the LCS 250 and is operatively coupled to the hardware processor 330 and the optional battery detector 322. The power supply 320 can function similar to the manner that the power source 110 of FIG. 1 functions. The power supply 320 is one or more sources of energy (e.g., electricity) used to provide power and/or control to the hardware processor 330, the battery detector 322, and/or any other component of the LCS 250. The power supply 320 typically provides electricity that is in AC format and/or DC format. The power supply 320 can be physically separate from the other components of the LCS 250 and/or internal within the housing 302 of the LCS 250.

The amount of power delivered by the power supply 320 to the hardware processor 350 can be any amount suitable to operate the hardware processor 350. In certain exemplary embodiments, the power delivered by the power supply 320 is transformed, rectified, inverted, and/or otherwise manipulated, at the power supply 320, so that the hardware processor 350 and/or other various components of the LCS 250 receive a proper voltage and/or current level to operate properly. For example, the power supply 320 can include four diodes configured as a full wave bridge rectifier to convert AC power to DC power.

The hardware processor 330 receives power from the power supply 320 and is communicably coupled to the timer 332, the communications component 350, the memory 380, the indicating lights 370, and the capacitor 334. In general, one or more instructions is received by the communication component 350 from a user 190. The hardware processor 330 interprets, using software stored in the memory 380, such instructions and determines whether a control event is required. If a control event is required, the hardware processor 330 energizes a coil 392 of the relay 390, which closes (enabled state) the contact 394 of the relay 390. If there is no control event required, then the microprocessor does not energize the coil 392 of the relay 390, which leaves the contact 394 normally open (disabled state).

The exemplary hardware processor 330 within the housing 302 of the LCS 250 is configured to execute software in accordance with one or more exemplary embodiments. Specifically, the hardware processor 330 is configured to execute the instructions used to operate the LCS 250, including any of its components, described above and shown in FIG. 3, as well as software used by a user 190. The exemplary hardware processor 330 is an integrated circuit, a central processing unit, a multi-core processing chip, a multi-chip module including multiple multi-core processing chips, or other hardware processor. The hardware processor 330 can be known by other names, including but not limited to a computer processor, a microcontroller, a microprocessor, and a multi-core processor.

In one or more exemplary embodiments, the hardware processor 330 is configured to execute software instructions stored in the memory 380 of the LCS 250. The exemplary memory 380 can include one or more cache memories, main memory, and/or any other suitable type of memory. In certain exemplary embodiments, the memory 380 is discretely located within the housing 302 relative to the hardware processor 330. In certain configurations, the memory 380 can also be integrated with the hardware processor 330. The hardware processor 330 can be integrated into one or more mixed signal integrated circuits. In such a case, the profile and/or cost of the hardware processor 330 can be reduced.

The exemplary timer 332 can be part of the hardware processor 330 or a separate component. The timer 332 keeps clock time and/or tracks one or more periods of time, such as an amount of time since receiving instructions to initiate a control event or an amount of time since receiving power from the thermostat 140. The exemplary timer 332 is able to track one or more time periods concurrently. The exemplary timer communicates times to the hardware processor 330. The timer 332 also receives instructions from the hardware processor 330 to start tracking one or more time periods and/or time delays. For example, the timer 332 notifies the hardware processor 330 when a certain amount of time has lapsed, such as the length of time that a control event has been active. The timer 332 can be a physical timer, separate from the hardware processor 330, or software/firmware installed on the hardware processor 330.

In certain exemplary embodiments, the timer 332 receives power from the optional battery 324 so that the timer 332 is always receiving power, even when the remaining components of the LCS 250 are not receiving power because the thermostat 140 is disabled. The timer 332 is communicably coupled to the hardware processor 330 to communicate clock time and/or one or more periods of time measured by the timer 332.

In certain exemplary embodiments, the optional battery 324 is electrically coupled to the timer 332. The battery 324 can provide power to the timer 332 so that the timer 332 is always operating, even if the power supply 320 is not receiving power from the thermostat 140. The battery 324 can be disposed inside of the housing 302, affixed to the housing 302, or placed in a location remote from the housing 302. The battery 324 can be fixedly or removably coupled to the housing 302. When the battery 324 is removably coupled to the housing 302, the battery 324 can be replaced. The battery 324 can use one or more of a number of types of cell, including but not limited to fixed, rechargeable, nickel cadmium, lithium, nickel metal hydride. The battery 324 can be any type of energy storage device, including but not limited to a super capacitor, a fuel cell, and a flywheel.

The battery 324 can be electrically coupled to the timer 332 using a wired and/or wireless technology. The battery 324 can be rechargeable or non-rechargeable. For example, if the battery 324 is rechargeable, when power is fed to the power supply 320 from the thermostat 140, a trickle charge may be sent from a component (e.g., the hardware processor 330, the power supply 320) to the battery 324 to charge the battery 324. In certain exemplary embodiments, the battery 324 can also be electrically coupled to one or more indicating lights 370 and/or the battery detector 322.

An optional battery detector 322 can be operatively coupled to the battery 324 and the hardware processor 330. The battery detector 322 can determine the amount of charge that the battery 324 has remaining and communicate this information to the hardware processor 330. The hardware processor 330 can then use this information to communicate the status of the battery 324 (e.g., using one or more indicating lights 370) to a user 190. The battery detector 322 can operate continuously or at select times (e.g., when the thermostat 140 is not sending power to the power supply 320, every 30 minutes, upon receiving an instruction from the hardware processor 330).

In certain exemplary embodiments, the capacitor 334 is electrically coupled to the hardware processor 330. The capacitor 334 can also be electrically coupled to the timer 332. The capacitor 334 can be any type of capacitor (e.g., electrolytic capacitor, electric double-layer capacitor) having one of a number of different capacitances (e.g., 3 kF, 1 µf). The capacitor 334 can be used for one or more of a number of purposes, including but not limited to storing power for use by the hardware processor 330 and/or the capacitor 332, and to smooth power delivered to the microprocessor 330. The other end of the capacitor 334 can be electrically coupled to ground 336.

The indicating lights 370 are electrically coupled to the hardware processor 330. The indicating lights 370 can be one or more light sources that are used to indicate one or more statuses of a component of the LCS 250 and/or a mode of operation of the LCS 250. The indicating lights 370 can be any type of light source, including but not limited to a light-emitting diode (LED), or organic LED, and an incandescent bulb. An indicating light 370 can radiate one or more of a number of colors. An indicating light 370 can be constantly illuminated, illuminated for certain period of time, or illuminated during certain events.

For example, an indicating light 370 can illuminate when the battery 324 is running low on power, as determined by the battery detector 322. As another example, an indicating light 370 can illuminate red when there is a control event occurring and green when no control event is occurring. An indicating light 370 can be mounted on the housing 302 (so that the indicating light 370 is visible from outside the housing 302), mounted inside the housing 302 (so that the indicating light 370 is visible when a portion of the housing 302 is removed or through a port on the surface of the housing 302), or in a location (e.g., a control room, an indicating panel) that is remote from the housing 302.

The relay 390 is substantially similar to the contactor 120, as described above with respect to FIG. 1. The relay 390 includes a coil 392 and a relay contact 394. The coil 392 of the relay 390 is electrically coupled to the hardware processor 330. The relay contact 394 of the relay 390 is normally open (disabled) when the coil 392 is not energized. The relay contact 394 has an input portion 393 and an output portion 395. The input portion 393 of the relay contact 394 is electrically coupled to the output portion 143 of the thermostat 140 and the primary side 311 of the transformer 310. The output portion 395 of the relay contact 394 is electrically coupled to the coil 341 of the contactor 120.

The first relay contact 344 and the second relay contact 347 of the contactor 120 are normally open (disabled) when the coil 341 of the contactor 120 is not energized. The first relay contact 344 and a second relay contact 347 of the contactor 120 both become enabled (closed) at substantially the same time when the coil 341 is energized. The output portion 346 of the first relay contact 344 and the input portion 349 of the second relay contact 347 are electrically coupled to the power-consuming device 125 using conductor 121 and conductor 122, respectively. The output portion 348 of the second relay contact 347 is electrically coupled to the primary side 131 of the transformer 130 and the power source (not shown in FIG. 3) using conductor 112. The input portion 345 of the first relay contact 344 is electrically coupled to the primary side 131 of the transformer 130 and the power source (not shown in FIG. 3) using conductor 111.

In certain exemplary embodiments, the communication component 350 of the LCS 250 sends signals to and receives signals from a user 190. Specifically, the communication component 350 receives signals regarding a demand response instruction (e.g., a control event, a software upgrade) from a demand response entity. In addition, the communication component 350 can send signals to the demand response entity providing information (e.g., status) regarding a demand response instruction.

The communication component 350 can communicate with one or more user 190s using one or more communication protocols and/or technologies. Examples of such communication protocols and/or technologies include, but are not limited to, radio frequency identification (RFID), Zigbee, Wi-Fi, the Internet, and radio data system (RDS). As an example, the communication component 350 can send and receive signals with a user 190 using radio signals. In such a case, the communication component 350 can include an antenna 352 to improve the signals sent and received with the user 190. The communication component 350 can communicate with the user 190 by following one or more of a number of communication protocols used by the user 190. The communication component 350 can communicate using wired or wireless technology.

The communication component 350 is communicably coupled to the hardware processor 330. The signals received by the communication component 350 are delivered to the hardware processor 330, which translates such signals into instructions. The signals sent by the communication component 350 are generated by the hardware processor 330 and formatted to be sent according to the appropriate communication protocol for the user 190. Some or all of the communication component 350 can be mounted on the housing 302 (e.g., the antenna 352 protruding from the housing 302), mounted inside the housing 302, or in a location (e.g., a roof top) that is remote from the housing 302.

Because the communication component 350, in certain exemplary embodiments, is only powered when the thermostat 140 is in the enabled state (when the contact within the thermostat is closed), the user 190 attempting to communicate with the LCS 250 should be configured in a way that allows the signals sent by the user 190 to be received by the communications component 350 when the communications component 350 is enabled. For example, the user 190 can be configured to send its signals more frequently and repeat sending such signals until the user 190 receives confirmation that the communications component 350 has received such signals. As another example, the user 190 can be configured to have a buffer sufficient to hold any signals that have not been received and release such signals from the buffer when the communication component 350 has indicated to the user 190 that the communication component 350 is enabled.

Each time that the thermostat 140 is enabled, sending power to the LCS 250, the hardware processor 330 can implement a configurable delay (e.g., a few seconds) when initializing. During this delay, the hardware processor 330 instructs the communication component 350 to search for signals associated with a control event. If there is no control event that is to be executed immediately, when the configurable delay is over, the hardware processor 330 allows the power from the thermostat 140 to flow through the LCS 250 to the contactor 120 and, ultimately, the power-consuming device 125. In certain exemplary embodiments, during the configurable delay, the hardware processor 330 does not deliver power to the coil 392 of the relay 390, and so the contact 394 of the relay 390 remains open (disabled). The delay can be tracked by the timer 332 or by the hardware processor 330.

Figure 4:
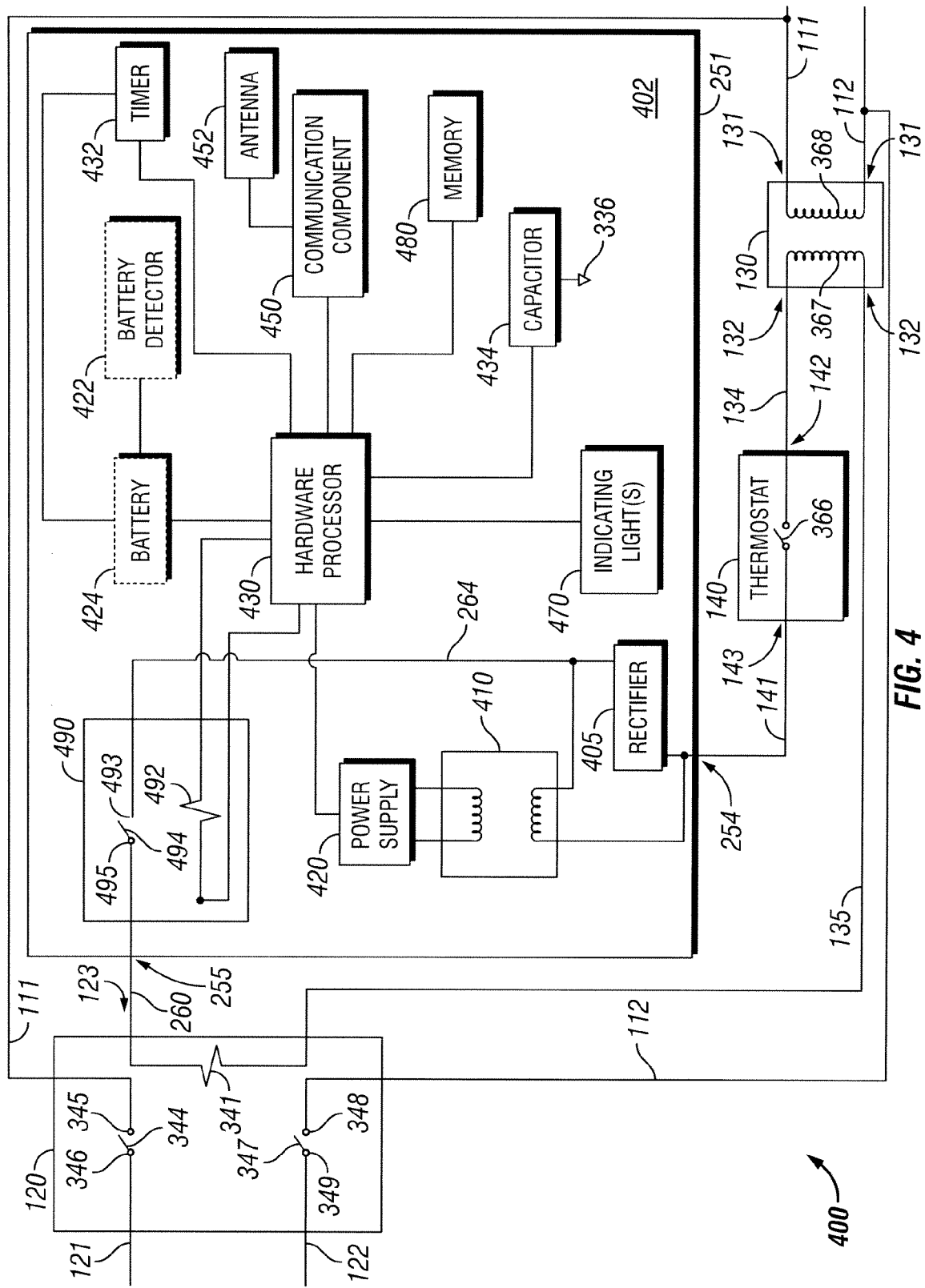
FIG. 4 shows another circuit diagram of another exemplary LCS in accordance with certain exemplary embodiments.

FIG. 4 shows a circuit diagram 400 of an exemplary LCS 251 in accordance with certain exemplary embodiments. Specifically, the circuit diagram 400 shows a portion of the system 201 of FIG. 2B. The circuit diagram 400 includes the LCS 251, the contactor 120, the thermostat 140, and the transformer 130. The LCS 251 of FIG. 4 includes a housing 402, inside of which are disposed a transformer 410, a power supply 420, a hardware processor 430, a timer 432, a capacitor 434, a communication component 450, a relay 490, one or more indicating lights 470, an optional battery 424, and an optional battery detector 422. In certain embodiments, one or more of the components shown in FIG. 4 can be combined, omitted, repeated, and/or substituted. Accordingly, embodiments of the exemplary LCS 251 should not be considered limited to the specific arrangements of components shown in FIG. 4.

Referring to FIGS. 1-4, the components of the LCS 251 in FIG. 4 are substantially the same as the corresponding components described above with respect to FIGS. 1-3, except as noted below. Specifically, the LCS 251 in FIG. 4 includes a rectifier 405 that conditions the power received from the thermostat 140 before sending the power to the transformer 410 within the LCS 251. The rectifier 405 of the LCS 251 can be used because the neutral conductor 135 that is electrically coupled to the secondary side 132 of the transformer 130 is also electrically coupled to the input portion 123 of the contactor 120, rather than to the secondary side 132 of the transformer 130 of the LCS 250. The rectifier 405 can function similar to the manner that the power source 110 of FIG. 1 functions.

The rectifier 405 is electrically coupled to the output portion 143 of the thermostat 140 using the voltage conductor 134, to the power supply 420, and to the input portion 493 of the relay contact 494 of the relay 490. Specifically, the rectifier 405 receives the input power signal (power) from the thermostat 140. Such power is processed by the rectifier 405 and sent to both the power supply 420 and the input portion 493 of the relay contact 494 of the relay 490.

In certain exemplary embodiments, the voltage processed by the rectifier 405 is transformed, rectified, inverted, and/or otherwise manipulated so that the rest of the LCS 251 receives a proper voltage level to operate properly. The rectifier 405 can include one or more of a number of discrete components (e.g., diodes, as shown in FIG. 4), integrated circuits, some other electrical component, or any suitable combination thereof.

Figure 5:
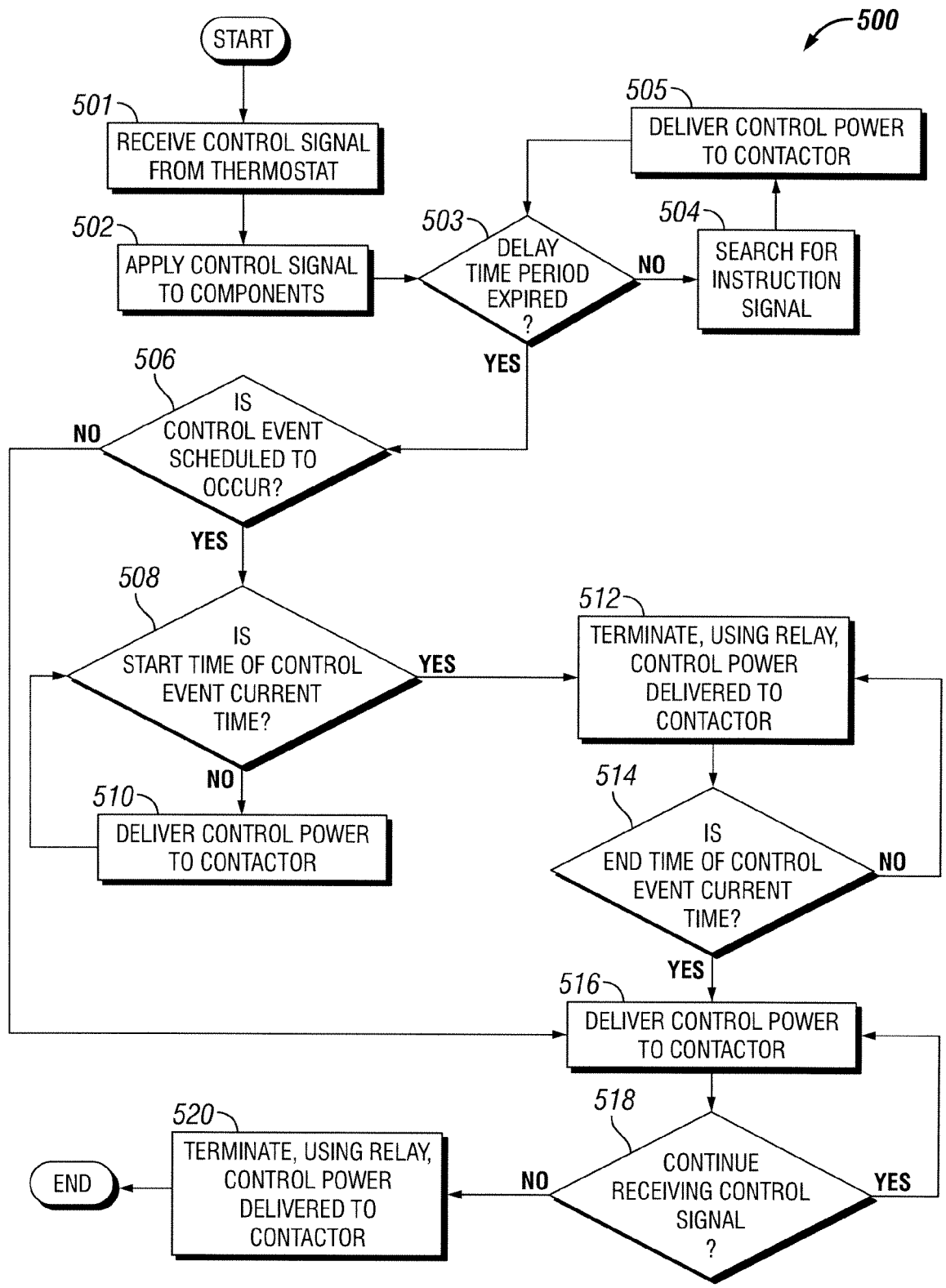
FIG. 5 shows a flowchart of a method for controlling power delivered to a power-consuming device in accordance with certain exemplary embodiments.

FIG. 5 shows a flowchart of a method 500 for controlling power delivered to a power-consuming device in accordance with certain exemplary embodiments. While the various steps in these flowcharts are presented and described sequentially, one of ordinary skill will appreciate that some or all of the steps may be executed in different orders, may be combined or omitted, and some or all of the steps may be executed in parallel. Further, in certain exemplary embodiments, one or more of the steps described below may be omitted, repeated, and/or performed in a different order.

In addition, a person of ordinary skill in the art will appreciate that additional steps, omitted in FIG. 5, may be included in performing these methods. Accordingly, the specific arrangement of steps shown in FIG. 5 should not be construed as limiting the scope. In addition, a particular computing device, as described, for example, in FIG. 6 below, may be used to perform one or more of the steps for the method 500 described below.

Referring now to FIGS. 1-5, one exemplary method 500 begins at the START step and continues to step 501. In step 501, a control signal is received from the thermostat 140. The control signal can be received by the LCS 250 and, more specifically, the transformer 310 feeding the power supply 320 of the LCS 250. The thermostat 140 sends the control signal when a contact within the thermostat 140 closes, allowing the control power to flow therethrough. In certain exemplary embodiments, the control signal is received from the thermostat 140 for a limited period of time. Such a period of time can depend on one or more of a number of factors, including but not limited to the current value of a parameter compared to a threshold value of the parameter. For example, the control signal is received for as long as an ambient temperature exceeds a threshold temperature. Such a comparison can be made by the thermostat 140. The control signal can be received continuously by the LCS 250 for the period of time. The control signal can be constant, periodic, or have any type of regular pattern.

In step 502, the control signal is applied to a number of components. Specifically, the transformer 310 of the LCS 250 transforms the control signal and applies the resulting transformed control signal to a number of components associated with the LCS 250. Examples of such components can include, but are not limited to, the hardware processor 330, the timer 332, the coil 392 of the relay 390, and the optional battery detector 322.

When the LCS 250 applies the transformed control signal signal, it can do so in a number of steps. For example, the LCS 250 can initially activate the communications component 350 and the hardware processor 330. Once activated, the communications component 350 can search for and receive any instruction signals associated with a control event. The hardware processor 330 can then receive such instruction signals associated with a control event from the communications component 350. In addition, while the communications component 350 is receiving instruction signals associated with a control event, the hardware processor 330 can be activating one or more other components of the LCS 250. Examples of such other components can include, but are not limited to, one or more indicating lights 370, the capacitor 334, and the battery detector 322.

In step 503, a determination is made as to whether a delay time period has expired. When the transformed control signal is received by the hardware processor 330, the hardware processor 330 communicates with the timer 332 to start measuring a delay time period. The delay time period is a period of time in which the LCS 250 initializes and stabilizes after receiving the control power. For example, during the delay time period, the hardware processor 330 can stabilize, the communication component 370 can search for and receive any instruction signals, and the hardware processor 330 can process any instruction signals. The delay time period can be any amount of time that allows for the LCS 250 to initialize and stabilize. For example, the delay time period can be 1 minute, 5 minutes, or 10 minutes.

The time delay period can be set by a user 190, by default, and/or by some other entity and/or operating condition. The time delay period can also expire when the hardware processor 330 that the LCS 250 is stabilized, regardless of how long that takes. In such a case, if the time delay period exceeds a threshold time, a signal can be sent by the hardware processor 330, using the communication component 370, to notify one or more users 190 that maintenance may need to be performed on the LCS 250. If the time delay period has expired, the process proceeds to step 506. If the time delay period has not expired, the process proceeds to step 504.

In step 504, a search is made for an instruction signal. The search for the instruction signal is made by the communication component 370. The communication component 370 can use the antenna 372 in conducting the search for the instruction signal. To search for the instruction signal, the communication component 370 sends signals to and/or receives signals from a user 190 (e.g., a utility), from which the instruction signal originates. For example, the communication component 370 can send a signal to a user 190 requesting that any instruction signal be sent. In such a case, the user 190 responds to the request signal by sending the instruction signal. As another example, the user 190 can continually broadcast an instruction signal to the LCS 250 so that when the LCS 250 is activated, the communication component 370 receives the instruction signal.

In step 505, control power is delivered to the contactor 120. Specifically, during the delay time period, the hardware processor 330 sends a voltage to the coil 392 of the relay 390 to energize the relay 394. As a result, the normally-open contact 394 is closed, allowing the control power to flow through the contact 394 to energize the coil 341 of the contactor 120 (which, in turn, allows a power signal to flow to the power-consuming device 125). Because the power-consuming device 125 cannot operate unless it receives the power signal from the contactor 120, and because the contactor 120 cannot send the power signal to the power-consuming device 125 unless the contactor 120 receives the control signal from the relay 390 of the LCS 250, it can be said that the LCS 250 delivers power to the power-consuming device 125. Generally speaking, the LCS 250 controls the operation of the power-consuming device 125 during the delay time period. In alternative exemplary embodiments, the control power is withheld from the contactor 120 during the delay time period. The process forms a continuous loop between steps 503-505 until the delay time period has expired.

In step 506, a determination is made as to whether a control event is scheduled to occur. The determination as to whether a control event is scheduled to occur is made by the hardware processor 330 using the communication component 350. In certain exemplary embodiments, while the hardware processor 330 is being initialized (after receiving power initially), a delay can be incorporated into the LCS 250 to prevent any power from being sent to the power-consuming device 125 until the hardware processor 330 determines whether a control event is scheduled to occur. If a control event is scheduled to occur, the process proceeds to step 508. If a control event is not scheduled to occur, the process proceeds to step 516.

In step 508, a determination is made as to whether the start time of the control event is the current time. The control event has a start time and an end time. While the end time of the control event may not be known when the control event is issued, the start time generally is known when the control event is issued. The start time is when the control event begins. The start time can be in terms of a clock time (e.g., 9:30 a.m. Central standard time), an amount of time (e.g., the control event begins in 10 minutes), immediately, or some other suitable form of time. In certain exemplary embodiments, the start time that the control event is scheduled to occur is determined by the hardware processor 330 using the timer 332. The current time is determined by the timer 332 and communicated to the hardware processor 330. The hardware processor compares the start time and the current time. If the hardware processor 330 determines that the start time of the control event is the current time, then the process proceeds to step 512. If the hardware processor 330 determines that the start time of the control event is not the current time, then the process proceeds to step 510.

In step 510, control power is delivered to the contactor 120. In certain exemplary embodiments, the hardware processor 330 allows control power to flow to the contactor 120. For example, the hardware processor 330 sends a voltage to the coil 392 of the relay 390 of the LCS 250. When the coil 392 of the relay 390 is energized, the normally-open contact 394 of the relay 394 is closed (enabled), which allows the control power to flow to the contactor 120 (which, in turn, allows a power signal to flow to the power-consuming device 125). Because the power-consuming device 125 cannot operate unless it receives the power signal from the contactor 120, and because the contactor 120 cannot send the power signal to the power-consuming device 125 unless the contactor 120 receives the control signal from the relay 390 of the LCS 250, it can be said that the LCS 250 delivers power to the power-consuming device 125. The process forms a continuous loop between steps 508 and 510 until the start time of the control event is the current time.

In step 512, the control power delivered to the contactor 120 is terminated. The control power can be terminated by the LCS 250. Specifically, the control power is terminated by the hardware processor 330. For example, at the start time of the control event, the hardware processor 330 stops sending a voltage to the coil 392 of the relay 390 of the LCS 250. When the coil 392 of the relay 390 is deenergized, the normally-open contact 394 of the relay 394 is opened (disabled), which prevents the control power from flowing to the contactor 120 (which, in turn, turns off the power-consuming device 125 by terminating the power signal flowing to the power-consuming device 125).

In step 514, a determination is made as to whether the end time of the control event is the current time. The end time of the control event is when the control event ends. The end time can be in terms of a clock time (e.g., 9:30 a.m. Central standard time), an amount of time (e.g., the control event begins in 10 minutes), immediately, or some other suitable form of time. In certain exemplary embodiments, the end time that the control event is scheduled to occur is determined by the hardware processor 330 using the timer 332. The current time is determined by the timer 332 and communicated to the hardware processor 330. The hardware processor compares the end time and the current time. If the hardware processor 330 determines that the end time of the control event is the current time, then the process proceeds to step 516. If the hardware processor 330 determines that the start time of the control event is not the current time, then the process reverts to step 512. In such a case, the process forms a continuous loop between steps 512 and 514 until the end time of the control event is the current time.

In step 516, power is delivered to the contactor 120. In certain exemplary embodiments, the hardware processor 330 allows power to flow to the contactor 120. For example, as in step 510, the hardware processor 330 sends a voltage to the coil 392 of the relay 390 of the LCS 250. When the coil 392 of the relay 390 is energized, the normally-open contact 394 of the relay 394 is closed (enabled), which allows the power to flow to the contactor 120 (which, in turn, turns on the power-consuming device 125 by allowing a power signal to flow to the power-consuming device 125).

In step 518, a determination is made as to whether the control signal continues to be received. In other words, the thermostat 140 stops delivering the control signal to the LCS 250. In certain exemplary embodiments, the determination as to whether the control signal continues to be received is made by the hardware processor 330 of the LCS 250. Such a determination can be made using one or more of a number of methods, including but not limited to a voltmeter within the hardware processor 330 and an ammeter within the hardware processor 330. If the control signal continues to be received, the process reverts to step 516. In such a case, the process forms a continuous loop between steps 514 and 516 until the control signal is no longer received. If the control signal is no longer received (is terminated), the process proceeds to step 520.

In step 520, the control power delivered to the contactor 120 is terminated. In this case, the thermostat 140 stops delivering the control signal LCS 250, which means that the LCS 250 is deactivated. When the LCS 250 is deactivated, the hardware processor 330 stops sending a voltage to the coil 392 of the relay 390 of the LCS 250. When the coil 392 of the relay 390 is deenergized, the normally-open contact 394 of the relay 394 is opened (disabled), which prevents the control power from flowing to the contactor 120 (which, in turn, shuts off the power-consuming device 125). After step 520, the method ends at the END step.

Figure 6:
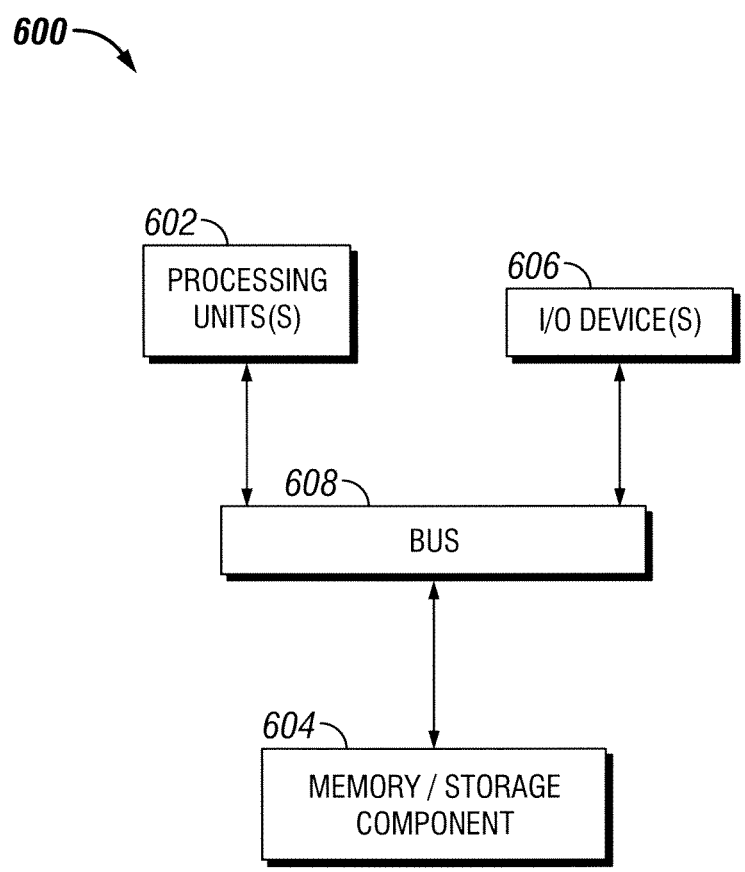
FIG. 6 shows a computer system used with an exemplary LCS in accordance with certain exemplary embodiments.

FIG. 6 illustrates one embodiment of a computing device 600 capable of implementing one or more of the various techniques described herein, and which may be representative, in whole or in part, of the elements described herein. Referring to FIGS. 1-6, the computing device 600 is only one example of a computing device and is not intended to suggest any limitation as to scope of use or functionality of the computing device and/or its possible architectures. Neither should computing device 600 be interpreted as having any dependency or requirement relating to any one or combination of components illustrated in the example computing device 600. As shown in FIG. 6, the bus 608 is operatively coupled to each of the processing unit(s) 602, the I/O device(s) 606, and the memory/storage component 604.

Computing device 600 includes one or more processors or processing units 602, one or more memory/storage components 604, one or more input/output (I/O) devices 606, and a bus 608 that allows the various components and devices to communicate with one another. Bus 608 represents one or more of any of several types of bus structures, including a memory bus or memory controller, a peripheral bus, an accelerated graphics port, and a processor or local bus using any of a variety of bus architectures. Bus 608 can include wired and/or wireless buses.

Memory/storage component 604 represents one or more computer storage media. Memory/storage component 604 may include volatile media (such as random access memory (RAM)) and/or nonvolatile media (such as read only memory (ROM), flash memory, optical disks, magnetic disks, and so forth). Memory/storage component 604 can include fixed media (e.g., RAM, ROM, a fixed hard drive, etc.) as well as removable media (e.g., a Flash memory drive, a removable hard drive, an optical disk, and so forth).

One or more I/O devices 606 allow a customer, utility, or other user 190 to enter commands and information to computing device 600, and also allow information to be presented to the customer, utility, or other user 190 and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media may be any available non-transitory medium or non-transitory media that can be accessed by a computing device. By way of example, and not limitation, computer readable media may comprise "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The computer device 600 may be connected to a network (not shown) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system 600 includes at least the minimal processing, input, and/or output means necessary to practice one or more embodiments.

Further, those skilled in the art will appreciate that one or more elements of the aforementioned computer device 600 may be located at a remote location and connected to the other elements over a network. Further, one or more exemplary embodiments may be implemented on a distributed system having a plurality of nodes, where each portion of the implementation (e.g., communication component 350, hardware processor 330) may be located on a different node within the distributed system. In one or more embodiments, the node corresponds to a computer system. Alternatively, the node may correspond to a processor with associated physical memory. The node may alternatively correspond to a processor with shared memory and/or resources.

Exemplary embodiments provide for low voltage LCSs. Specifically, exemplary embodiments provide for a LCS that is electrically coupled to low voltage (e.g., 24 VAC) conductors, terminals, and/or other electrical connections. In addition, the exemplary LCS is only on (consuming power) when a thermostat within the electrical system feeds a low voltage signal to the LCR. When the thermostat is not enabled (disabled), the LCS is not enabled (deactivated). When the thermostat is enabled (activated), the LCS is enabled (activated). As a result, the LCS consumes less energy using exemplary embodiments described herein.

In addition, exemplary embodiments allow for savings in cost and material with respect to a LCR. Specifically, engineers designing a system using a LCS can use more available and less expensive conductor sizes (voltage and/or amperage rating) because, using exemplary LCSs, voltage and/or amperage requirements are reduced. As such, less cost and material is required for a particular LCS because less material is required.

In addition, the use of exemplary low voltage LCSs can allow an individual who is not a licensed electrician to install the LCR. In such a case, installation costs are reduced, and there is no need to work with the schedule of a third party to install the LCR. Further, even when not installed by a licensed electrician, the installed LCS allows the applicable electrical system to meet any applicable codes and/or regulations.

Although embodiments described herein are made with reference to exemplary embodiments, it should be appreciated by those skilled in the art that various modifications are well within the scope and spirit of this disclosure. Those skilled in the art will appreciate that the exemplary embodiments described herein are not limited to any specifically discussed application and that the embodiments described herein are illustrative and not restrictive. From the description of the exemplary embodiments, equivalents of the elements shown therein will suggest themselves to those skilled in the art, and ways of constructing other embodiments using the present disclosure will suggest themselves to practitioners of the art. Therefore, the scope of the exemplary embodiments is not limited herein.

What is claimed is:

1. A method for controlling power delivered to a power-consuming device, the method comprising:
   receiving, by a load control switch, a low voltage control signal from a thermostat, wherein the thermostat receives the low voltage control signal from a power source, wherein the low voltage control signal is less than a pre-determined threshold voltage, wherein the thermostat has an enabled state and a disabled state, wherein the enabled state allows the low voltage control signal to pass therethrough, and wherein the disabled state prevents the low voltage control signal from passing therethrough;
   converting, using a control transformer of the load control switch, the low voltage control signal to a transformed control signal;
   applying the transformed control signal to a power supply of the load control switch, wherein the power supply is activated upon receiving the transformed control signal, wherein the power supply, when activated, powers a plurality of components of the load control switch, wherein the plurality of components of the load control switch comprises a communication component and a timer;
   determining, using the communication component and the timer, a start time of a control event;
   terminating, using a relay at the start time of the control event, control power delivered to a contactor that feeds a power signal to the power-consuming device, wherein terminating the control power to the contactor prevents delivery of the power signal to the power-consuming device;
   delivering, using the relay at an end time of the control event, the control power to the contactor, wherein delivering the control power to the contactor delivers the power signal to the power-consuming device; and deactivating the load control switch when the low voltage signal from the thermostat is terminated, wherein the low voltage control signal being less than the pre-determined threshold voltage allows installation of the load control switch without a licensed electrician.

2. The method of claim 1, wherein applying the transformed control signal to the plurality of components comprises:

activating the communication component and a hardware processor, wherein the plurality of components comprises the communication component and the hardware processor;

receiving, using the communication component, the transformed control signal; and activating, while receiving the transformed control signal, a remainder of components for controlling the control power delivered to the contactor.

3. The method of claim 1, further comprising:

delivering, after determining the start time of the control event and using the relay prior to the start time of the control event, the control power to the contactor.

4. The method of claim 1, wherein the timer is constantly powered by a power source independent of the low voltage control signal from the thermostat.

5. The method of claim 1, wherein the relay comprises a contact that is opened to terminate the control power based, in part, on a signal generated by a hardware processor in response to the control event.

6. The method of claim 1, wherein the low voltage control signal is approximately 24 volts alternating current.

7. The method of claim 1, wherein the thermostat sends the low voltage control signal when an ambient temperature exceeds a high temperature threshold.

8. The method of claim 1, wherein the power-consuming device is an air conditioning unit.

9. A load control receiver, comprising:

a control transformer electrically coupled to a thermostat, wherein the control transformer receives a low voltage control signal originating from the thermostat and generates a transformed control signal, wherein the thermostat receives the low voltage control signal from a power source, wherein the low voltage control signal is less than a pre-determined threshold voltage, wherein the thermostat has an enabled state and a disabled state, wherein the enabled state allows the low voltage control signal to pass therethrough, and wherein the disabled state prevents the low voltage control signal from passing therethrough;

a power supply electrically coupled to the control transformer, wherein the power supply activates upon receiving the transformed control signal;

memory for storing a plurality of instructions;

a hardware processor coupled to the power supply and the memory, wherein the hardware processor executes the plurality of instructions stored in the memory;

a communication component communicably coupled to the hardware processor, wherein the communication component receives an instruction signal for a control event; and a relay electrically coupled to the hardware processor, a power-consuming device, and the power supply, wherein the relay comprises a relay contact, wherein the relay contact has an open state and a closed state, wherein the open state is enabled during the control event, and wherein the closed state is enabled outside of the control event, wherein the relay contact, when in the closed state, delivers the power processed by the power transformer to the power-consuming device, and wherein the low voltage control signal being less than the pre-determined threshold voltage allows installation of the load control switch without a licensed electrician.

10. The load control receiver of claim 9, wherein the control transformer comprises a primary winding and a secondary winding, wherein the power supply is electrically coupled to a voltage conductor and a neutral conductor of the secondary winding of the control transformer.

11. The load control receiver of claim 10, wherein the relay contact comprises a first end and a second end, wherein the first end is electrically coupled to a voltage conductor of the primary winding of the control transformer, and wherein the second end is electrically coupled to a first end of a coil of a contactor.

12. The load control receiver of claim 11, wherein the coil of the contactor comprises a second end that is electrically coupled to a neutral conductor of the primary winding of the control transformer, wherein the primary winding of the control transformer is further electrically coupled to a secondary winding of a power transformer, wherein the secondary winding of the power transformer is further electrically coupled to the thermostat.

13. The load control receiver of claim 10, wherein the load control receiver further comprises a rectifier having a first end and a second end, wherein the first end is electrically coupled to the voltage conductor of the primary winding of the control transformer, and wherein the second end is electrically coupled to the neutral conductor of the primary winding of the control transformer.

14. The load control receiver of claim 13, wherein the second end of the rectifier is further electrically coupled to the thermostat, and wherein the first end of the rectifier is further electrically coupled to a first end of the relay contact.

15. The load control receiver of claim 14, wherein the relay contact comprises a second end that is electrically coupled to a first end of a coil of a contactor, wherein the coil of the contactor comprises a second end that is electrically coupled to a secondary winding of a power transformer, wherein the secondary winding of the power transformer is further electrically coupled to the thermostat.

16. The load control receiver of claim 9, wherein the power supply comprises a full wave bridge rectifier.

17. The load control receiver of claim 9, wherein the communication component comprises a radio communication device.

18. The load control receiver of claim 9, further comprising:

a timer electrically coupled to an alternative power source, wherein the alternative power source is a 9 volt battery.

19. The load control receiver of claim 18, further comprising a battery detector and at least one light emitting diode to indicate a status of the battery.

20. A system, comprising:

a power-consuming device;

a power transformer that generates a low voltage control signal from a power signal received from a power source, wherein the low voltage control signal is less than a pre-determined threshold voltage;

a thermostat electrically coupled to the power transformer, wherein the thermostat has an enabled state and a disabled state, wherein the enabled state allows the control power to pass therethrough, and wherein the disabled state prevents the control power from passing therethrough;

a load control receiver electrically coupled to the thermostat and the power-consuming device, wherein the load control receiver comprises:
  a control transformer electrically coupled to the thermostat, wherein the control transformer receives the low voltage control signal from the thermostat and generates a transformed control signal;
  a power supply electrically coupled to the control transformer, wherein the power supply activates upon receiving the transformed control signal;
  memory for storing a plurality of instructions;
  a hardware processor electrically coupled to the power supply and the memory, wherein the hardware processor executes the plurality of instructions stored in the memory;
  a communication component communicably coupled to the hardware processor, wherein the communication component receives a signal for a control event; and
  a relay electrically coupled to the hardware processor, the power supply, and the power-consuming device, wherein the relay comprises a relay contact, wherein the relay contact has an open state and a closed state, wherein the open state is enabled during the control event, and wherein the closed state is enabled outside of the control event, wherein the relay contact, when in the closed state, delivers the power processed by the power transformer to the power-consuming device, and wherein the low voltage control signal being less than the pre-determined threshold voltage allows installation of the load control switch without a licensed electrician.

* * * * *